June 24, 1930.  G. L. HILL  1,768,062
SPRAYING DEVICE
Filed June 4, 1928  2 Sheets-Sheet 1

Inventor
G. L. Hill
By Clarence A. O'Brien
Attorney

June 24, 1930.  G. L. HILL  1,768,062
SPRAYING DEVICE
Filed June 4, 1928  2 Sheets-Sheet 2

Inventor
G. L. Hill
By Clarence A. O'Brien
Attorney

Patented June 24, 1930

1,768,062

UNITED STATES PATENT OFFICE

GROVER L. HILL, OF BAGLEY, WISCONSIN

SPRAYING DEVICE

Application filed June 4, 1928. Serial No. 282,699.

This invention relates to improvements in spraying devices, and has more particular reference to a device for spraying insecticide solution upon animals.

An important object of the invention is the provision of an insecticide solution containing receptacle which is connected with a suitable pressure line and provided with novel solution elevating and discharging means.

The particular details and their relative arrangement and association will become more readily apparent from the novel description and drawings.

Figure 1:
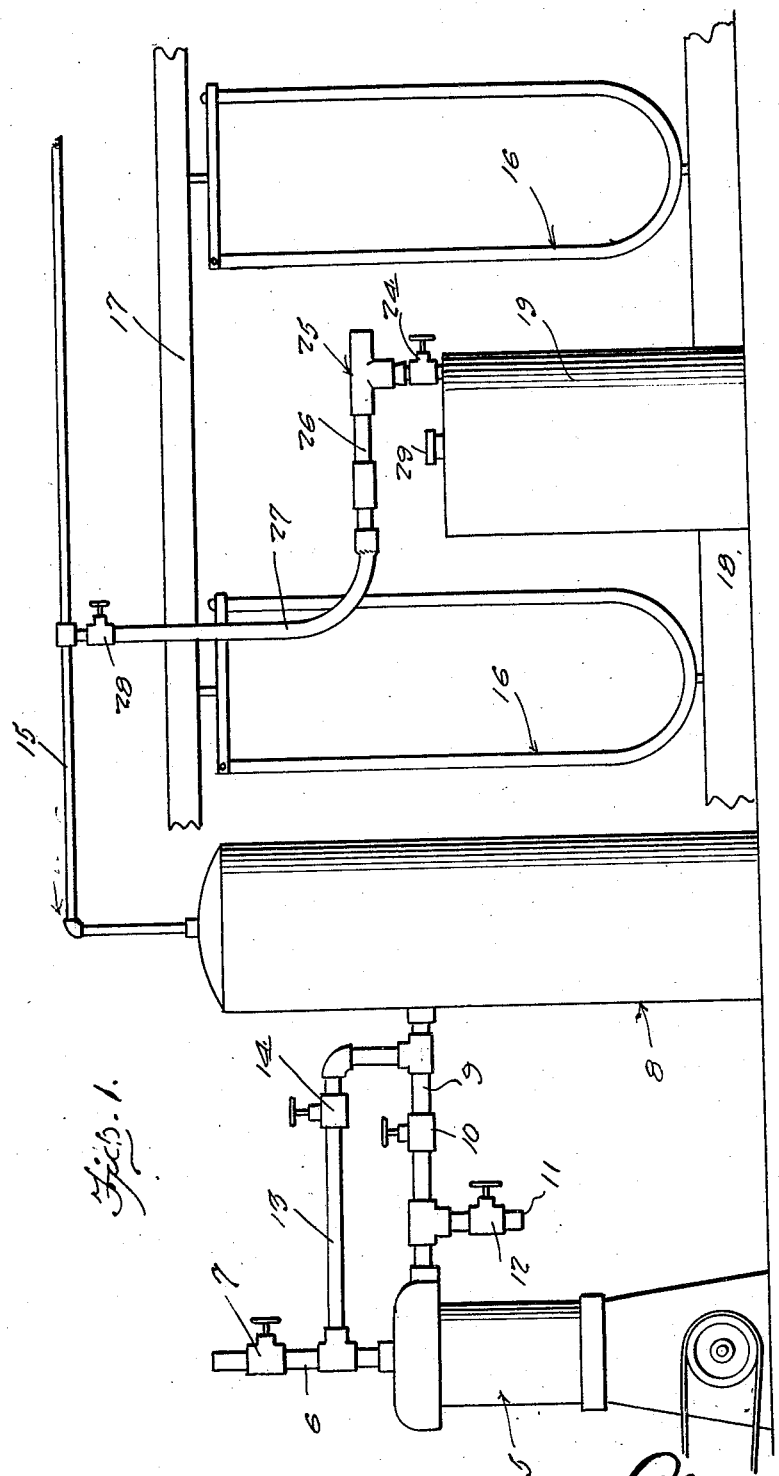
Figure 1 is a side elevational view of the complete machine or apparatus.

Referring now to the drawings by numerals, it will be observed that 5 designates a suitable power driven pump, provided at its top with an exhaust pipe 6 having a control valve 7 located therein. Located adjacent the pump is a vertically elongated tank 8, which has connection with the pump through the medium of a pipe 9. In this pipe 9 is the control valve 10 for regulating the suction produced by the pump in the tank 8. Connected with the pipe 9 is the short branch pipe 11 having the control valve 12, through which atmospheric air is introduced into the pump 5. A pressure pipe 13 is connected with the exhaust pipe 6, provided with a control valve 14 and in turn connected with the suction pipe 9, thereby affording communication between the exhaust and the tank 8.

Leading from the tank is a pipe 15, and this pipe 15 extends over the extensions 16, which are as usual supported in the stall upon appropriate supports 17 and 18.

Figure 2:
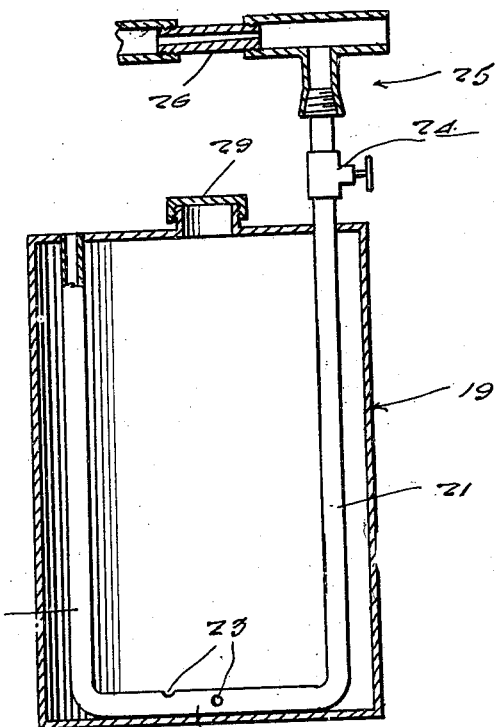
Figure 2 is a sectional and elevational view of the insecticide container, and elevating and discharging means.
Figure 4:
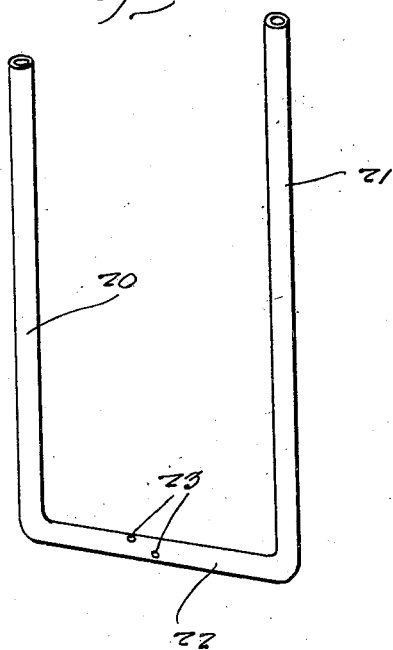
Figure 4 is a perspective view of the substantially U-shaped suction pipe which operates to elevate and discharge the insecticide solution.
Figure 3:
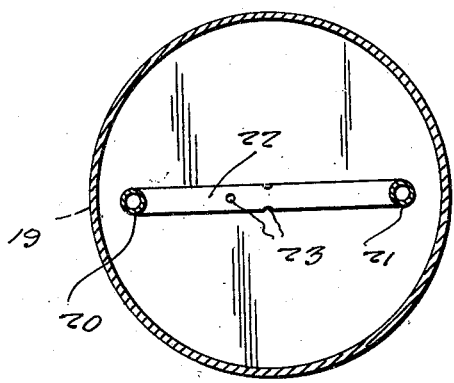
Figure 3 is a section through Figure 2.

Located in the stall between the extensions is the insecticide solution container 19. As shown in Figure 2, a substantially U-shaped pipe is located in this receptacle. It comprises an air intake branch 20, a solution elevating and discharging branch 21, a connecting portion 22, the latter having solution intake ports 23.

The branch 21 extends above the top of the receptacle and is provided with control valves 24. Above this it has connection with a substantially T-shaped discharge nozzle 25. The nozzle has connection with the pipe 15, through the medium of a sectional pipe 26 and a flexible hose 27, the hose being connected with a valve 28, located close to the pipe 15. This pipe 28 is referred to in the trade as a stall cock. In addition, the container 19 is provided with a filler neck and removable closure cap 29.

When the apparatus is used for milking, it is obvious that it is necessary to produce suction in the tank 8 and the line 15. At this time, the valve 28 is closed. The valve 10 is open to afford communication between the pump 5 and the tank 8. The valve 12 is closed off to shut off outside air. The valve 7 is open to allow the pump to exhaust. The valve 14 is closed to prevent the exhaust from passing through the pressure pipe 13 into the tank 8. Hence, when the pump is set into operation, suction is produced in the usual way before milking.

When using the device for spraying the insecticide solution from the container 19, the valves are reversed. For example, the valve 28 is now open, the valve 10 is closed, the valve 12 is opened to let air into the pump 14. The valve 14 is opened, and the valve 7 closed to shunt the exhaust pressure through the valve 13, the valve 14 and pipe 9 into the tank 8. The pressure passing through the pipe 15 now and through the hose 27, exhausts through the nozzle 25, and produces sufficient suction upon the upper end of the solution elevating branch 21, to suck up in the solution through the port 23, and to allow the solution to spray in a mist, when the valve 24 is opened.

Minor changes in the size, shape and rearrangement of parts coming within the invention claimed may be resorted to, without departing from the spirit of the invention or the scope of the appended claim.

Having thus described my invention, what I claim as new is:

A solution spray device of the class described comprising a solution container having a closure cap threaded thereon at the top of said container, a substantially U-shaped pipe arranged within said container, said U-shaped pipe having one branch thereof secured at its terminal to the top wall of said container for communication with the atmosphere, said U-shaped pipe having a second branch extending upwardly and through the top wall of said container, a manually controlled valve on the extended upper end of said second branch, a substantially T-shaped spray nozzle having one branch thereof threaded on the upper free end of said second branch of said U-shaped pipe, said spray nozzle having a second branch adapted to be connected to a pressure supply mechanism, and the intermediate portion of said U-shaped pipe being provided with solution intake ports, the said intermediate portion of said U-shaped pipe resting upon the bottom of said container.

In testimony whereof I affix my signature.

GROVER L. HILL.